United States Patent
Robillard et al.

(10) Patent No.: US 6,220,042 B1
(45) Date of Patent: Apr. 24, 2001

(54) METHOD AND DEVICE FOR MOTOR VEHICLE HEATING AND AIR CONDITIONING MONITORING WINDSCREEN MISTING

(75) Inventors: Jérôme Robillard, Paris; Christophe Petitjean, Neauphle le Vieux, both of (FR)

(73) Assignee: Valeo Climatisation, La Verriere (FR)

(*) Notice: Subject to any disclaimer, the term of this patent is extended or adjusted under 35 U.S.C. 154(b) by 0 days.

(21) Appl. No.: 09/402,077
(22) PCT Filed: Jan. 29, 1999
(86) PCT No.: PCT/FR99/00190
§ 371 Date: Sep. 28, 1999
§ 102(e) Date: Sep. 28, 1999
(87) PCT Pub. No.: WO99/38719
PCT Pub. Date: Aug. 5, 1999

(30) Foreign Application Priority Data

Jan. 29, 1998 (FR) .................................... 9800999

(51) Int. Cl.[7] .................................................. F25B 29/00
(52) U.S. Cl. .......................... 62/173; 62/176.1; 62/176.6; 62/196.4; 62/159; 165/204; 165/231; 165/254
(58) Field of Search ..................... 62/173, 176.1, 62/176.6, 244, 196.4, 197, 159; 165/204, 231, 254; 236/91 C

(56) References Cited

U.S. PATENT DOCUMENTS 4,408,660 * 10/1983 Sutoh et al. ............................ 165/21
4,783,970 * 11/1988 Takahashi ............................ 62/176.3
4,878,358 * 11/1989 Fujii ........................................ 62/227
4,895,000 * 1/1990 Takahashi ............................ 62/176.3
4,896,589 * 1/1990 Takahashi ............................. 98/2.01
4,910,967 * 3/1990 Takahashi ............................ 62/176.1
4,920,755 * 5/1990 Tadahiro ................................ 62/171
5,701,752 * 12/1997 Tsunokawa et al. ................... 62/183

* cited by examiner

Primary Examiner—Corrine McDermott
Assistant Examiner—Marc Norman
(74) Attorney, Agent, or Firm—Morgan & Finnegan LL

(57) ABSTRACT

The invention concerns a refrigerating fluid circuit capable of operating in three fluid circulation modes, namely an air conditioning mode whereby the fluid circulates successively in the evaporator where it is evaporated by receiving the heat of the air flow to be treated, in the compressor, in the condenser where it is condensed by yielding the heat to another medium and in a pressure reducing valve; a supplementary heating mode whereby the fluid circulates in gaseous state between the evaporator where it yields heat to the air flow and the compressor, without passing through the condenser, and an inoperative mode whereby the fluid does not circulate in the evaporator. The invention is characterized in that the circulation mode is determined taking into account not only the user's choice but also the possible presence of mist on the windscreen, detected by a sensor, so as to promote demisting while optimizing comfort and energy conservation.

38 Claims, 3 Drawing Sheets

METHOD AND DEVICE FOR MOTOR VEHICLE HEATING AND AIR CONDITIONING MONITORING WINDSCREEN MISTING

BACKGROUND OF THE INVENTION

The invention concerns a method for treating an air flow to be sent into the passenger compartment of a vehicle, in which the air flow, before being exposed where necessary to a heat source, passes through an evaporator which forms part of a refrigerating fluid circuit also comprising a compressor, a condenser and at least one pressure reducing valve, taking account of the choice made by a user between at least one working mode of the said circuit in which the fluid circulates in the evaporator so as to modify the temperature of the air flow and an idle mode in which the fluid does not circulate in the evaporator.

Such a method is commonly used for air conditioning the vehicle passenger compartment. It is also used, by means of a refrigerating fluid circuit like those described in FR-A-2 717 126 and FR-A-2 731 952, in a working mode where the evaporator yields heat to the air flow, in order to supplement an insufficient contribution by the heat source, in particular when the latter is a heat exchanger through which the fluid cooling the engine driving the vehicle passes, and the engine, and consequently the cooling fluid, have not reached their normal operating temperature.

It is also known that the appearance of mist on the windows can be detected by means of a suitable sensor, and that the sensor signal can be used for triggering an action aimed at eliminating the mist. This action consists of favouring the sending of hot air to the misted glazed surfaces, either by modifying the distribution of the treated air flow between different outlet vents in the passenger compartment, or by an overall increase in the rate of this flow, or by increasing the exchanges between the latter and the heat source, or by combining these different methods. In no case does the signal from the mist sensor act on the circulation of the refrigerating fluid.

BRIEF DESCRIPTION OF THE INVENTION

It has now been discovered that the detection of the presence of mist could advantageously be used for controlling the refrigerating fluid circuit, either for preventing a circulation mode promoting misting, or on the contrary for reserving a circulation mode which is costly in energy for a case where it is useful for demisting.

A first aspect of the invention relates notably to a method of the type defined in the introduction, and makes provision for any presence of mist to be detected on at least one glazed surface of the vehicle to which at least part of the treated flow is sent and for the result of the detection to be taken into account, conjointly with the choice of the user, for defining the conditions of circulation of the refrigerating fluid.

Optional characteristics of the invention, complementary or alternative, are set out below:

The refrigerating fluid circuit has, as a working mode, an air conditioning mode in which the fluid circulates successively through the evaporator, where it vaporises whilst receiving heat from the air flow, through the compressor, through the condenser where it condenses whilst yielding heat to another medium, and through a pressure reducing valve, the air conditioning mode being enabled only in the case of misting, at least in a given temperature range outside the vehicle, and the idle mode being activated when the air conditioning mode is chosen and not enabled.

The air conditioning mode is enabled only in the event of misting below a first external temperature limit value and is enabled independently of the misting above the said first limit value.

The refrigerating fluid circuit has, as a working mode, an additional heating mode in which the fluid circulates in the gaseous state between the evaporator, where it yields heat to the air flow, and the compressor, the enabling of the additional heating mode and/or the flow rate of refrigerating fluid therein being in accordance with the misting.

The additional heating mode is controlled according to the misting below a second external temperature limit value lower than the first limit value, and totally inhibited above the said second limit value, and the air conditioning mode is enabled, in the event of misting, only above the said second limit value.

Above the second limit value, the additional heating mode is inhibited if misting appears whilst this same mode is activated, and enabled in the contrary case.

According to a second aspect of the invention, a signal representing the rate of variation in the degree of misting of a glazed surface in a vehicle is taken into account for managing the treatment of an air flow to be sent at least partly to this glazed surface, and notably to enable or not a working mode in the method according to the first aspect of the invention.

It is also possible to combine the said signal representing the rate of variation in the degree of misting with a signal representing the degree of misting.

According to a third aspect of the invention, the presence of mist and/or the variation in the degree of misting are detected on two regions of the vehicle windscreen remote from each other by means of a single sensor comprising a transmitter which transmits radiation to the said regions and a receiver which receives radiation coming therefrom.

In an advantageous combination of at least two aspects of the invention, the presence of mist and/or the variation in the degree of misting on the top part and on the bottom part of the windscreen are detected, by means of the same sensor or separate sensors, and the detection signals relating to the top part are used to control the air conditioning mode and the detection signals relating to the bottom part to control the additional heating mode.

Another object of the invention is an air treatment device for implementing the method as defined above, comprising a refrigerating fluid circuit including an evaporator, a compressor, a condenser and at least one pressure reducing valve, a heat source, means for causing the said air flow to pass through the evaporator and then in contact with the heat source before sending it at least partly to at least one glazed surface of the vehicle, means for causing the fluid to circulate in the circuit in accordance with at least one working mode, selection means enabling a user to choose between this or these working modes and an idle mode, means for detecting any presence of mist on at least one glazed surface of the vehicle to which at least part of the treated flow is sent and for producing a signal in response to the detection of mist, and control means for controlling the fluid circulation mode according to the choice of the user and the said signal.

The device according to the invention can also comprise means for determining the temperature outside the vehicle, the control means being able to take account of the said temperature.

BRIEF DESCRIPTION OF THE DRAWINGS

The characteristics and advantages of the invention will be disclosed in more detail in the following description, referring to the accompanying drawings, in which.

DETAILED DESCRIPTION OF THE INVENTION

Figure 1:
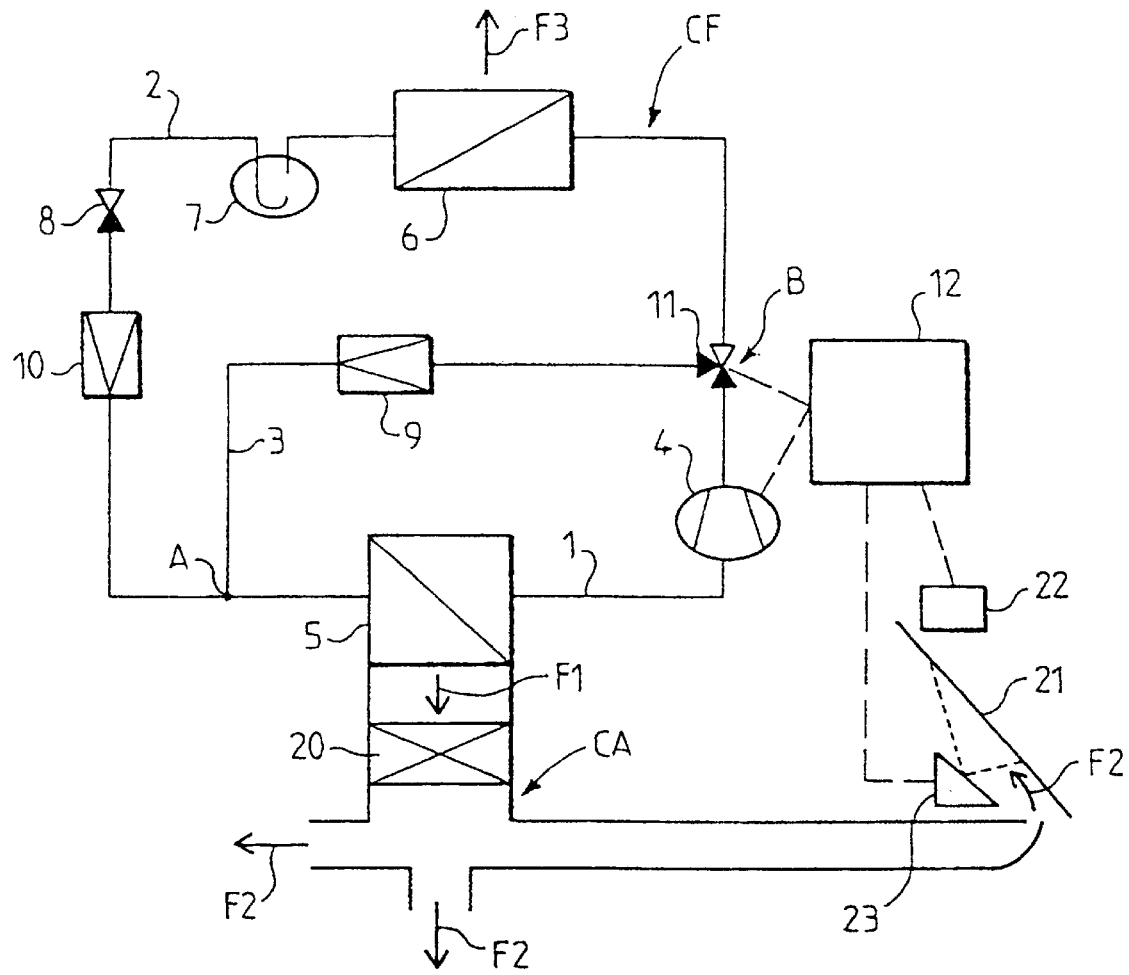
FIG. 1 is a diagram of a device according to the invention.

The device of FIG. 1 comprises a circuit CF in which there circulates a refrigerating fluid able to change from the liquid state to the gaseous state by absorbing heat, and from the gaseous state to the liquid state by yielding up heat. The components of this circuit are divided into three branches 1, 2 and 3 connected together at two junction points A and B. The branch 1 contains a compressor 4 which causes the fluid to circulate therein from point A to point B, and an evaporator 5 placed upstream of the compressor. The branch 2 contains, from point B to point A, a condenser 6, a vessel 7, a non-return valve 8 and a pressure reducing valve 10. Another pressure reducing valve 9 is placed in the branch 3. The three ways of a three-way valve 11 placed at point B communicate respectively with the branches 1, 2 and 3. The compressor 4 and valve 11 are controlled by a control module 12 so as to establish, for the device, an air conditioning mode, an additional heating mode or an idle mode, these three modes being described below.

The device also comprises a circuit CA for air to be treated, depicted in a highly simplified fashion. In this circuit, an air flow produced by a fan or blower, not shown, and represented by the arrow F1, passes through the evaporator 5 and then, where applicable, a heating radiator 20. The air is then distributed in a known fashion, in accordance with the arrows F2, at different points in the passenger compartment of the vehicle, and in particular in the direction of the windscreen 21. Although, in FIG. 1, the flow F1 is depicted as passing through the radiator 20, known means can be provided for enabling all or part of the air flow to avoid the radiator, according to the heating requirements of the passenger compartment.

The device also comprises means which are not shown, and notably a fan, for circulating an air flow indicated by the arrow F3 in thermal contact with the condenser 6.

A sensor 22 detects the temperature outside the vehicle passenger compartment, and transmits a corresponding signal to the control module 12. In addition, in the example illustrated, a mist sensor 23 monitors both the lower region of the windscreen 21, where the mist forms first and where the appearance of abnormal optical characteristics therefore indicates the start of misting, and the upper part where the mist disappears last, and where the return to normal optical characteristics therefore indicates the end of misting. The signals produced by the sensor 23 are sent to the control unit 12.

When the device is operating in air conditioning mode, the valve 11 is controlled so as to send the fluid delivered by the compressor to the condenser 6, where it condenses whilst yielding heat to the air flow F3, and then passes through the vessel 7 and non-return valve 8 and undergoes pressure reduction in the pressure reducing valve 10. The fluid vaporises in the evaporator 5 whilst cooling the air flow F1. The gaseous fluid emerging from the evaporator 5 is once again drawn in by the compressor.

In additional heating mode, the fluid circulates in the heating loop formed by the branches 1 and 3. Emerging from the compressor 4, it passes through the valve 11, and then through the pressure reducing valve 9 and, remaining in gaseous state, reaches the evaporator 5 where it yields heat to the air flow F1. The fluid then returns to the compressor.

In the idle mode, the compressor 4 is out of service and no fluid circulates in the circuit, so that no exchange of heat occurs between the evaporator and the air flow F1.

Figure 2:
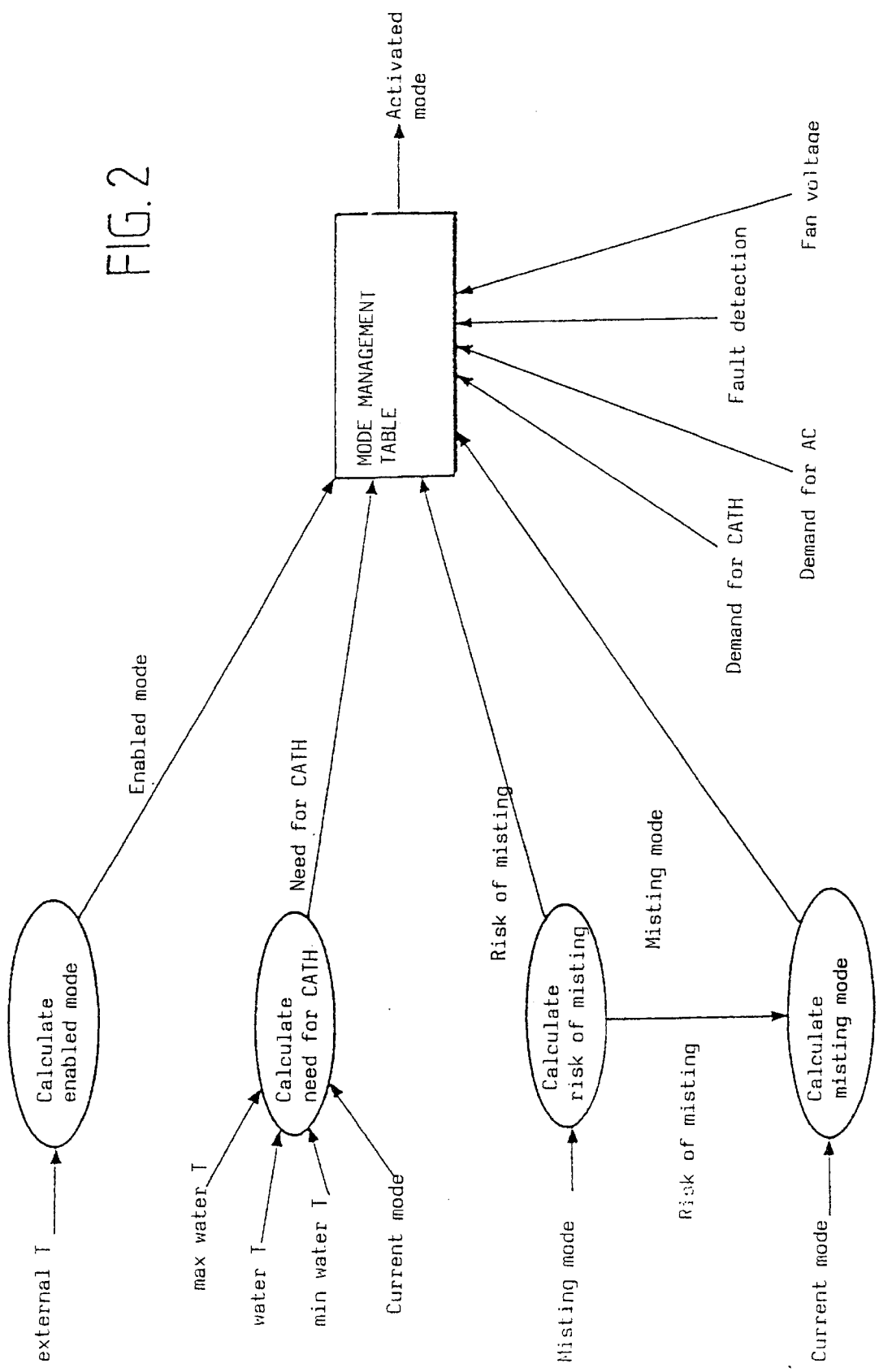
FIG. 2 is a flow diagram illustrating the method according to the invention.

Table 1 below and FIG. 2 depict respectively a truth table and a flow diagram relating to the control of the circuit CF by the module 12, in the method according to the invention.

TABLE 1

| Mode enabled | Demand for CATH | Demand for AC | Need for CATH | Risk of misting | Misting mode | Mode activated |
|---|---|---|---|---|---|---|
| CATH | YES | X | TRUE | YES | CATH/AC | IDLE |
| CATH | YES | X | TRUE | YES | IDLE | CATH |
| CATH | YES | X | TRUE | NO | X | CATH |
| CATH | YES | X | FALSE | X | X | IDLE |
| CATH | NO | X | X | X | X | IDLE |
| REHEAT | X | YES | X | NO | X | IDLE |
| REHEAT | X | YES | X | YES | X | AC |
| REHEAT | X | NO | X | X | X | IDLE |
| AC | X | YES | X | X | X | AC |
| AC | X | NO | X | X | X | IDLE |

In the table, the symbols "CATH" and "AC" designate respectively the additional heating mode and air conditioning mode. The sign X at the intersection of a row and column signifies that the variable associated with the column is non-existent or without effect because of the values of the other variables appearing in the same row.

The first column of the table relates to the variable "Mode enabled", which is a function of the external temperature measured by the sensor 22. The value of this variable is CATH, REHEAT and AC respectively for the temperature ranges <5° C. to 18° C. and >18° C.

For the variables "Demand for CATH" and "Demand for AC", the values YES and NO signify respectively that the corresponding mode is and is not selected by the user.

As indicated in FIG. 2, the variable "Need for CATH" is evaluated by a comparison between the temperature of the cooling fluid circulating in the radiator 20 (water T) and reference values min water T and max water T, so as to prevent the additional heating mode being activated whilst the temperature is sufficient to allow sufficient heating of the flow F1 by the radiator 20. The variable "Current mode", which represents the operating mode activated at the time of the evaluation, makes it possible to prevent start-up of the additional heating mode as from the temperature value min water T, and not to interrupt it when it is already activated except for the value max water T.

The variable "Risk of misting" is evaluated from the variable "Misting probe" supplied directly or indirectly by the sensor 23, so as to indicate whether or not the windscreen is misted. The variable "Misting mode" exists only if this same variable is equal to YES, and is then equal to the variable "Mode activated".

Figure 3:
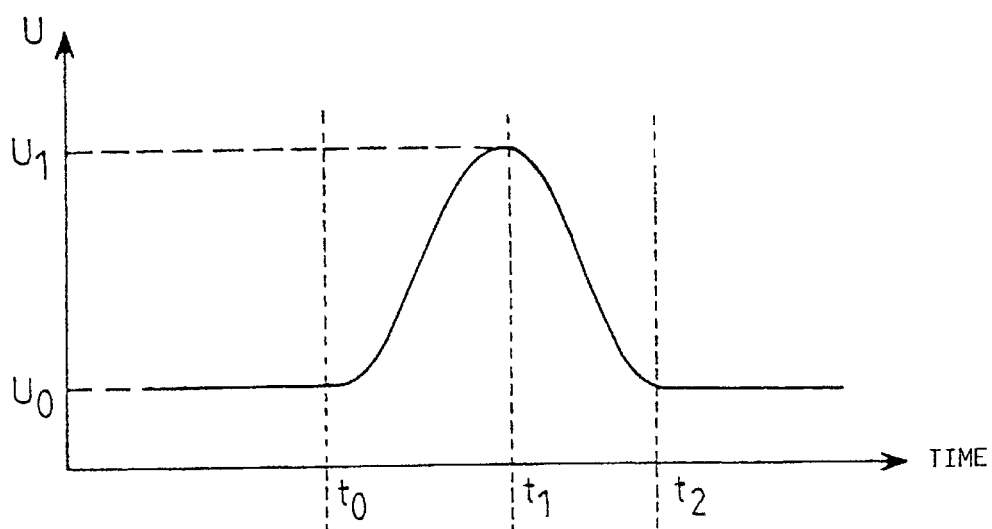
FIG. 3 combines three graphs 3a, 3b and 3c showing the variation over time in signals produced when misting is detected in one embodiment of the method according to the invention.
Figure 3:
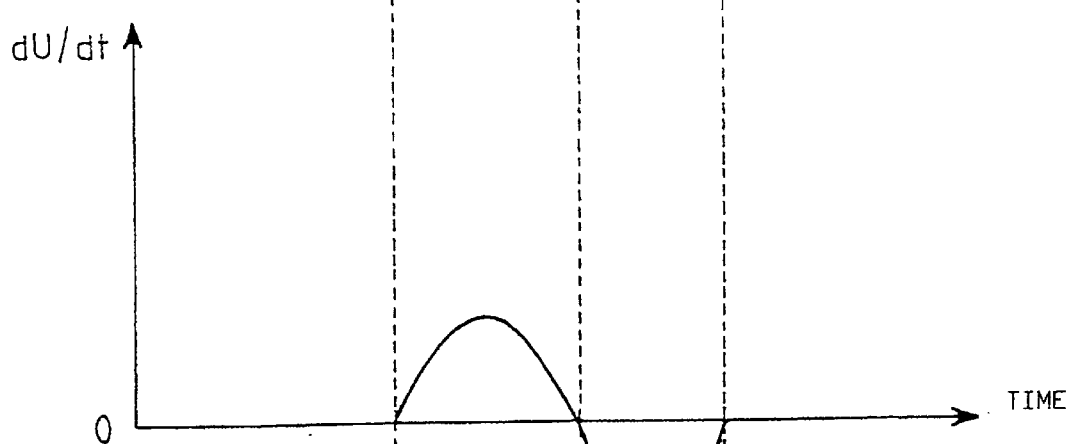
Figure 3:
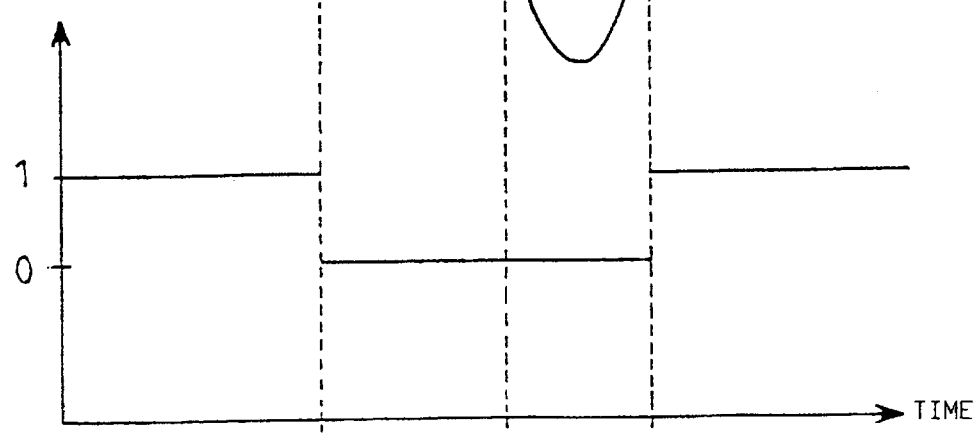

FIG. 3 shows a typical curve 3a of variation over time of a voltage signal U produced by a known infrared radiation or ultrasonic mist sensor. In the absence of mist, this signal has a constant value $U_0$. As from a time to, mist is detected and the signal U increases. The corrective action triggered in response to the detection causes a slowing down in the misting and then a demisting, so that the signal passes through a maximum $U_1$ at a time $t_1$ before decreasing in order to return to the value $U_0$ at a time $t_2$.

The curve 3b represents the variation over time of the derivative of U with respect to time, dU/dt. This derivative is zero before to, positive between $t_0$ and $t_1$, negative between $t_1$ and $t_2$, and once again zero beyond $t_2$.

The curve 3c represents a binary signal resulting from the process of the signal U and/or the signal dU/dt and which takes the value 1 in the absence of misting, that is to say before $t_0$ at $t_2$, and the value zero when misting is present, that is to say between to and $t_2$. This signal can constitute the variable "Misting probe".

Use of the signal dU/dt notably dispenses with the need to know the value $U_0$ of the voltage signal in the absence of misting.

As is clear from the present description, the different aspects of the invention can be used both individually and in all combinations. In particular, the sensor 23 can be replaced by a sensor monitoring a single area of the windscreen, or by two sensors each monitoring one area. Moreover, as also indicated above, in the temperature range of the CATH mode, the idle mode can be replaced by an additional heating mode at reduced fluid flow.

What is claimed is:

1. A method for treating a flow of air to be sent into a passenger compartment of a vehicle, in which the air flow, before being exposed where necessary to a heat source, passes through an evaporator which forms part of a refrigerating fluid circuit, the refrigerating fluid circuit further comprising a compressor, a condenser and at least one pressure reducing valve, taking account of a choice made by a user between at least one working mode of said circuit in which the fluid circulates in the evaporator to modify the temperature of the air flow, the at least one working mode including an air conditioning mode in which the fluid circulates successively through the evaporator, the fluid vaporizing in the evaporator while receiving heat from the air flow, through the compressor, through the condenser, where the fluid condenses while yielding heat to another medium, and through a pressure reducing valve, and an idle mode in which the fluid does not circulate in the evaporator, the method comprising:

detecting a presence of mist on at least one glazed surface of the vehicle to which at least part of the treated flow is sent, and defining the circulation conditions of the refrigerating fluid based on the result of the detection and the choice of a user such that:

the air conditioning mode is enabled only if misting is detected below a first external temperature limit value;

the air conditioning mode is enabled independently of the detection of misting above the first external temperature limit; and the idle mode is activated when the air conditioning mode is chosen and not enabled.

2. A method according to claim 1, wherein the refrigerating fluid circuit further has, as a working mode, an additional heating mode in which the fluid circulates in the gaseous state between the evaporator, where it yields heat to the air flow, and the compressor, the method further comprising further defining the circulation condition such that the additional heating mode and/or the flow rate of refrigerating fluid therein are enabled dependent upon the detection of misting.

3. A method according to claim 2, wherein the additional heating mode is enabled according to the detection of misting below a second external temperature limit value lower than the first limit value, the additional heating mode is totally inhibited above the second limit value, and the air conditioning mode is enabled, in the event of misting, only above the second limit value.

4. A method according to claim 3, wherein above the second limit value, the additional heating mode is inhibited if misting appears while the additional heating mode is activated, and the additional heating mode is enabled in the absence of misting.

5. A method according to claim 2, wherein the presence of mist and/or the variation in the degree of misting on a top part and on a bottom part of the windscreen are detected, and detection signals relating to the top part are used to control the air conditioning mode and the detection signals relating to the bottom part are used to control the additional heating mode.

6. A method according to claim 1, wherein in order to enable or not to enable a working mode, a signal representing the rate of variation in the degree of misting of the said glazed surface is taken into account.

7. A method according to claim 6, wherein the signal representing the rate of variation in the degree of misting is combined with a signal representing the degree of misting.

8. A method according to claim 6, wherein the presence of mist and/or the variation in the degree of misting are detected on two regions of the vehicle windscreen remote from each other by means of a single sensor comprising a transmitter which transmits radiation to said regions and a receiver which receives radiation from said two regions.

9. An air treatment device comprising:

a refrigerating fluid circuit including an evaporator, a compressor, a condenser and at least one pressure reducing valve, a heat source, means for causing said air flow to pass through the evaporator and then to contact the heat source before sending said airflow, at least in part, to at least one glazed surface of the vehicle, means for causing the fluid to circulate in the circuit in accordance with at least one working mode, wherein said at least one working mode includes an air conditioning mode in which the fluid circulates successively through the evaporator, the fluid vaporizing in the evaporator while receiving heat from the air flow, through the compressor, through the condenser where the fluid condenses while yielding heat to another medium, and through the pressure reducing valve, selection means enabling a user to choose between said working mode and an idle mode, means for detecting a presence of mist on at least one glazed surface of the vehicle to which at least part of the treated flow is sent and for producing a signal in response to the detection of mist, means for determining the temperature outside the vehicle, and control means for controlling the fluid circulation mode according to the choice of the user, said signal and said temperature, such that:

the air conditioning mode is enabled only if misting is detected below a first external temperature limit value;

the air conditioning mode is enabled independently of the detection of misting above the first external temperature limit; and the idle mode is activated when the air conditioning mode is chosen and not enabled.

10. A method according to claim 9, wherein the refrigerating fluid circuit further has, as a working mode, an additional heating mode in which the fluid circulates in the gaseous state between the evaporator, where it yields heat to the air flow, and the compressor, the method further comprising further defining the circulation condition such that the additional heating mode is controlled dependent upon the detection of misting.

11. A method for treating a flow of air to be sent into a passenger compartment of a vehicle, comprising:

detecting mist on at least one glazed surface of the vehicle to which at least part of the treated flow is sent; and defining a circulation condition of the refrigerating fluid between a working mode of the circuit, wherein fluid is circulated through an evaporator of a refrigerating fluid circuit to modify the temperature of the air, and an idle mode, in which fluid does not circulate in the evaporator, based on the result of the detection of the presence of mist and the choice of the user;

the working mode including an additional heating mode, the additional heating mode being controlled based upon the detection of mist.

12. A method according to claim 11, wherein the working mode further includes an air conditioning mode, the method further comprising:

enabling the air conditioning mode when mist is detected, at least in a given temperature range outside the vehicle; and activating the idle mode when the air conditioning mode is chosen and not enabled.

13. A method according to claim 12, comprising enabling the air conditioning mode only when the presence of mist is detected below a first external temperature limit value, and enabling the air conditioning mode independently of the detection of mist above the first limit value.

14. A method according to claim 11, comprising:

enabling the additional heating mode if mist is detected below a second external temperature limit value lower than the first limit value;

totally inhibiting the additional heating mode above the second limit value; and enabling the air conditioning mode if mist is detected above the second limit value.

15. A method according to claim 11, further comprising inhibiting the additional heating mode above the second limit value, if mist is detected while the additional heating mode is activated, and enabling the additional heating mode above the second limit value, if mist is not detected.

16. A method according to claim 11, further comprising generating a signal representative of the rate of variation in the degree of misting of the at least one glazed surface and enabling or not enabling a working mode based on said signal.

17. A method according to claim 16, further comprising generating a second signal representative of the rate of variation in the degree of misting of the at least one glazed surface, combining said first signal with said second signal and enabling or not enabling the working mode based on the combined signal.

18. A method according to claim 16, further comprising detecting the rate of variation in the degree of misting on two regions of the vehicle windscreen remote from each other, and controlling the air conditioning mode based on the detected signal relating to the top part and controlling the additional heating mode based on the detected signal relating to the bottom part.

19. A method according to claim 11, comprising detecting mist on a top part and on a bottom part of the at least one glazed surface, generating signals indicative of the detection of mist on the top part and bottom part, respectively, and controlling the air conditioning mode based on the detection signals relating to the top part and controlling the additional heating mode based on the detection signals relating to the bottom part.

20. The method of claim 11, wherein the additional heating mode is enabled based upon the detection of mist.

21. The method of claim 11, wherein the flow rate of refrigerating fluid in the additional heating mode is controlled based upon the detection of mist.

22. An air treatment device for treating air flow to be sent to a passenger compartment of a vehicle, comprising:

a refrigerating fluid circuit including an evaporator, a compressor, a condenser and at least one pressure reducing valve;

a heat source;

means for causing said air flow to pass through the evaporator and then to contact the heat source before sending said air flow, at least in part, to at least one glazed surface of the vehicle;

means for causing the fluid to circulate in the refrigerating fluid circuit in accordance with at least one working mode in which the fluid circulates in the evaporator to modify the temperature of said air flow, the at least one working mode including an additional heating mode;

selection means enabling a user to choose between said working mode and an idle mode in which fluid does not circulate in the evaporator;

means for detecting mist on at least one glazed surface of the vehicle to which at least part of the treated air flow is sent and for producing a signal in response to the detection of mist; and control means for enabling one of the at least one circulation modes according to the choice of the user and said signal, the control means controlling the additional heating mode dependent on the presence of mist.

23. A device according to claim 22, further comprising means for determining the temperature outside of the vehicle, the control means enabling a particular circulation mode, at least in part, based on said temperature.

24. A device according to claim 23, wherein the working mode includes an air conditioning mode and the control means enables the air conditioning mode at a temperature below a first external temperature limit, only if mist is detected, and the control means enables the air conditioning mode above the first external temperature limit, regardless of whether mist is detected.

25. A device according to claim 24, wherein the control means:

enables the additional heating mode below a second external temperature limit value lower than the first limit value, if mist is detected;

totally inhibits the additional heating mode above the second limit value; and only enables the air conditioning mode if mist is detected, above the second limit value.

26. A device according to claim 24, wherein, if the additional heating mode is enabled, the control means further inhibits the additional heating mode above the second limit value if mist is detected while the additional heating mode is enabled, and enables the additional heating mode above the second limit value if mist is not detected.

27. A device according to claim 22, wherein the control means enables or inhibits a working mode based on a signal representing the rate of variation in the degree of misting of the glazed surface.

28. A device according to claim 22, wherein the control means combines said signal with a second signal representing the degree of misting, and enables or inhibits a working mode based on the combined signal.

29. A device according to claim 22, wherein the presence of mist is detected on a top part and on a bottom part of the at least one glazed surface, and detection signals relating to the top part are used to control the air conditioning mode and the detection signals relating to the bottom part are used to control the additional heating mode.

30. A device according to claim 29, wherein the means for detecting mist is a sensor comprising a transmitter which tansmits radiation to two regions of the windscreen and a receiver for receiving radiation from said two regions.

31. The method of claim 22, wherein the additional heating mode is enabled based upon the detection of mist.

32. The method of claim 22, wherein the flow rate of refrigerating fluid in the additional heating mode is controlled based upon the detection of mist.

33. An air treatment device for treating air flow to be sent to a passenger compartment of a vehicle, comprising:

a refrigerating fluid circuit including an evaporator, a compressor, a condenser and at least one pressure reducing valve;

a heat source;

means for causing said air flow to pass through the evaporator and then to contact the heat source before sending said air flow, at least in part, to at least one glazed surface of the vehicle;

means for causing the fluid to circulate in the refrigerating fluid circuit in accordance with at least one working mode in which the fluid circulates in the evaporator to modify the temperature of said air flow;

selection means enabling a user to choose between said working mode and an idle mode in which fluid does not circulate in the evaporator;

means for detecting mist on two regions of a glazed surface of the vehicle to which at least part of the treated air flow is sent and for producing a signal in response to the detection of mist; and control means for enabling one of the at least one circulation modes according to the choice of the user and said signal.

34. A device according to claim 33, wherein the means for separately detecting mist is a sensor comprising a transmitter which transmits radiation to two regions of the windscreen and a receiver for receiving radiation from said two regions.

35. A device according to claim 34, wherein the at least one circulation mode comprises an air conditioning mode and an additional heating mode, and the two regions of the glazed surface are a top part and a bottom part of the glazed surface, and detection signals relating to the top part are used to control the air conditioning mode and the detection signals relating to the bottom part are used to control the additional heating mode.

36. A method for treating a flow of air in a vehicle, comprising:

detecting mist on two regions of a windscreen of the vehicle; and enabling an air treatment according to the detection of the mist and the choice of a user.

37. The method of claim 36, comprising detecting the mist on a top part of the windscreen and on the bottom part of the windscreen.

38. The method of claim 37, further comprising controlling an air conditioning mode based in part on the detection of mist on a top portion of the windscreen and controlling a heating mode based in part on the detection of mist on the bottom portion of the windscreen.

* * * * *